(12) United States Patent
Palapra et al.

(10) Patent No.: US 10,693,761 B2
(45) Date of Patent: Jun. 23, 2020

(54) COMPUTER SYSTEM INCLUDING MULTILAYER SWITCHES

(71) Applicant: HEWLETT PACKARD ENTERPRISE DEVELOPMENT LP, Houston, TX (US)

(72) Inventors: Haris Palapra, Karnataka (IN); Mithun Kumar Halder, Karnataka (IN); Pavankumar Kulkarni, Karnataka (IN); Venkatavaradhan Devarajan, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 108 days.

(21) Appl. No.: 16/132,626

(22) Filed: Sep. 17, 2018

(65) Prior Publication Data

US 2020/0014613 A1 Jan. 9, 2020

(30) Foreign Application Priority Data

Jul. 2, 2018 (IN) .............................. 201841024660

(51) Int. Cl.
*H04L 12/751* (2013.01)
*H04L 12/24* (2006.01)
*H04L 12/707* (2013.01)

(52) U.S. Cl.
CPC ............ *H04L 45/02* (2013.01); *H04L 41/082* (2013.01); *H04L 45/22* (2013.01); *H04L 41/0668* (2013.01)

(58) Field of Classification Search
None
See application file for complete search history.

(56) References Cited

U.S. PATENT DOCUMENTS

| 8,572,225 | B2 | 10/2013 | Scudder et al. |
| 9,264,302 | B2 | 2/2016 | Ernstrom et al. |
| 9,306,804 | B2 | 4/2016 | Duda et al. |
| 9,600,263 | B2 | 3/2017 | Stolarchuk et al. |
| 2006/0087963 | A1 | 4/2006 | Jain et al. |
| 2015/0229560 | A1* | 8/2015 | Qiu .................. H04L 45/00 370/218 |

(Continued)

OTHER PUBLICATIONS

OSPF Graceful Shutdown, (Web Page), Retrieved Mar. 23, 2018, 8 Pgs.

*Primary Examiner* — Jutai Kao (57) ABSTRACT

A method may include storing updated firmware in storage of a target switch, transmitting instructions to the target switch to initiate a restart thereof, and transmitting a respective notification to (i) at least one switch in each of a core layer and aggregation layer of the computer system, and (ii) switches in an access layer if a switch of the aggregation layer is the selected target switch. The notification may be indicative of an impending shut down of the target switch and include instructions to each recipient switch to cease directing packets thereto. The method may also include processing any packets directed to the target switch prior to the receipt of the notification and compliance thereto by each recipient switch, confirming all packets directed to the target switch from each recipient switch have been received and processed, and restarting the target switch, thereby updating the firmware on the target switch.

20 Claims, 5 Drawing Sheets (56) References Cited

U.S. PATENT DOCUMENTS

2016/0019044 A1* 1/2016 Stolarchuk ............... G06F 8/65
  717/171
2016/0344617 A1* 11/2016 Gopalarathnam ...... H04L 45/22
2018/0167269 A1* 6/2018 Vu ........................ H04L 41/082

* cited by examiner

FIG. 5

COMPUTER SYSTEM INCLUDING MULTILAYER SWITCHES

CROSS-REFERENCE TO RELATED APPLICATION

This application claims the benefit of Indian Appl. No. 201841024660, filed Jul. 2, 2018. This application is incorporated herein by reference in its entirety to the extent consistent with the present application.

BACKGROUND

A broad spectrum of industries utilize computers systems, such as networks, to deliver fast, reliable access to information at relatively low cost. Networks, such as campus networks, can be represented as a hierarchical structure including a core layer, an aggregation (or distribution) layer, and an access (or edge) layer. The access layer is a mesh of switches, linked to other switches in the aggregation layer, which in turn are linked to switches in the core layer. The performance and extensibility of these multi-layer switches is an enabler of large-scale, highly-available, high-performance campus networks.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Generally, a computer system, such as a campus network, may be represented as a tiered or hierarchical structure including a core layer, an aggregation layer, and an access layer. The access layer may include a plurality of switches, each switch further connected to network devices, such as laptop computers, desktop computers, printers, personal digital assistants ("PDAs"), etc. The uplink connectivity of each of the switches is terminated on switches of the aggregation layer. The switches in the aggregation layer are further communicatively coupled to switches in the core layer, which in turn may be connected to another network, such as the Internet or some other computer system.

Each of the switches in the access layer is typically linked to at least a pair of the switches in the aggregation layer, and correspondingly, each of the switches in the aggregation layer is linked to at least one other in the aggregation layer and to at least a pair of the switches in the core layer. Such an arrangement provides multiple paths for network traffic, such that if one link or switch in the aggregation layer or core layer goes down unexpectedly or due to scheduled maintenance, network traffic can continue to flow using an alternative path. Although such a lattice of switches is beneficial for reliability purposes (i.e., prevents outages in the network), the temporary removal of a switch may still result in a loss of network traffic.

For example, each switch in the network generally runs on an operating system (e.g., Linux), which may be updated periodically to enhance existing features, add new features, correct deficiencies (e.g., bugs), etc. To update the operating system, the updated version is flashed to the switch, and the switch is subsequently taken offline and restarted to complete the installation of the updated operating system. Although the network traffic may be rerouted to other switches in the aggregation layer or core layer to process the network traffic intended for the switch taken offline, there are typically one or more seconds worth of packets queued at the originating switch or at the switch taken offline that are lost if there is insufficient preparation prior to temporarily removing the switch from the network. The loss of these packets may result, for example, in the loss of tens of gigabytes of network traffic in instances where the traffic is being transmitted at ten or more gigabytes per second.

Examples of the present disclosure are directed to a computer system in which one or more selected switches (i.e., target switches) in the aggregation layer or core layer may be temporarily removed from the computer system for maintenance or repair without the loss of network traffic in the computer system. In examples disclosed herein, one or more processors may communicate with the target switches to orchestrate the temporary removal of the target switches from the computer system in a selected order. Prior to being temporarily removed from the computer system, a target switch may communicate with each of the switches in the aggregation layer and the core layer of the computer system directly communicatively coupled to the target switch. In instances in which the target switch is a switch in the aggregation layer, the target switch may also communicate with at least one switch in the access layer.

In one or more examples, the communication may provide notification to each switch the target switch is directly communicatively coupled to in the aggregation layer and core layer (and each switch in the access layer in some examples) that a shutdown of the target switch is imminent, and the communication may further include respective instructions to each directly communicatively coupled switch to cease directing traffic to the target switch. The target switch may process any traffic in the receiving queue thereof and in a queue of an originating switch directly communicatively coupled thereto. After confirmation that all traffic in the receiving and originating switch queues has been processed, the target switch may be temporarily removed from the computer system (e.g., restarted). After restarting or otherwise reestablishing contact with the computer system, the target switch may provide notification to each switch the target switch is directly communicatively coupled to in the aggregation layer and core layer (and each switch in the access layer in some examples) that the target switch is available to receive traffic for processing. Upon confirmation that the target switch is available to receive traffic for processing, the one or more processors may select another target device in the aggregation layer or core layer for maintenance or repair without the loss of network traffic in the computer system.

More particularly, in one example of the present disclosure, a computer system may include a core layer, an access layer, an aggregation layer, a processor, and a non-transitory computer-readable storage medium. The core layer may include a pair of core switches communicatively coupled with one another. The access layer may include a plurality of access switches. The aggregation layer may include a pair of aggregation switches communicatively coupled with one another. Each aggregation switch may be further communicatively coupled to each core switch and each access switch. The non-transitory computer-readable storage medium may include instructions executable by the processor to: select a first target switch from the pair of core switches or the pair of aggregation switches to temporarily remove from the computer system; transmit a respective first notification to (i) each core switch and aggregation switch not selected as the first target switch, and (ii) the plurality of access switches if an aggregation switch is selected as the first target switch, the first notification indicative of an impending shut down of the first target switch and including instructions to each recipient switch to cease directing packets to the first target switch; process any packets directed to the first target switch prior to the receipt of the first notification and compliance thereto by each recipient switch; confirm all of the packets directed to the first target switch from each recipient switch have been received and processed; and restart the first target switch.

In another example of the present disclosure, a method is provided for updating firmware on one or more switches in a computer system. The method may include storing updated firmware in a storage of a first target switch. The first target switch may form part of the computer system including a core layer, an aggregation layer, and an access layer including a plurality of access switches. The first target switch may be selected from (i) a pair of core switches of the core layer or (ii) a pair of aggregation switches of the aggregation layer. The method may also include transmitting instructions to the first target switch to initiate a restart of the first target switch, and transmitting a respective first notification to (i) each core switch and aggregation switch not selected as the first target switch, and (ii) the plurality of access switches if an aggregation switch is selected as the first target switch. The first notification may be indicative of an impending shut down of the first target switch and include instructions to each recipient switch to cease directing packets to the first target switch. The method may further include processing any packets directed to the first target switch prior to the receipt of the first notification and compliance thereto by each recipient switch. The method may also include confirming all packets directed to the first target switch from each recipient switch have been received and processed, and restarting the first target switch, thereby updating the firmware on the first target switch.

In another example of the present disclosure, a non-transitory computer-readable medium is provided and stores computer-executable instructions, which when executed, cause a computer to: store updated firmware in storage of a first target switch, the first target switch forming part of a computer system including a core layer, an aggregation layer, and an access layer including a plurality of access switches, and the first target switch selected from (i) a pair of core switches of the core layer or (ii) a pair of aggregation switches of the aggregation layer; direct the first target switch to initiate a restart of the first target switch; transmit a respective first notification to (i) each core switch and aggregation switch not selected as the first target switch, and (ii) the plurality of access switches if an aggregation switch is selected as the first target switch, the first notification indicative of an impending shut down of the first target switch and including instructions to each recipient switch to cease directing packets to the first target switch; process any packets directed to the first target switch prior to the receipt of the first notification and compliance thereto by each recipient switch; confirm all packets directed to the first target switch from each recipient switch have been received and processed; restart the first target switch to update the firmware on the first target switch; and transmit a second notification to (i) each core switch and aggregation switch not selected as the first target switch, and (ii) the plurality of access switches if an aggregation switch is selected as the first target switch, the second notification indicative of the first target switch being available to process any packets directed thereto and including instructions to each recipient switch to resume directing packets to the first target switch.

Figure 1:
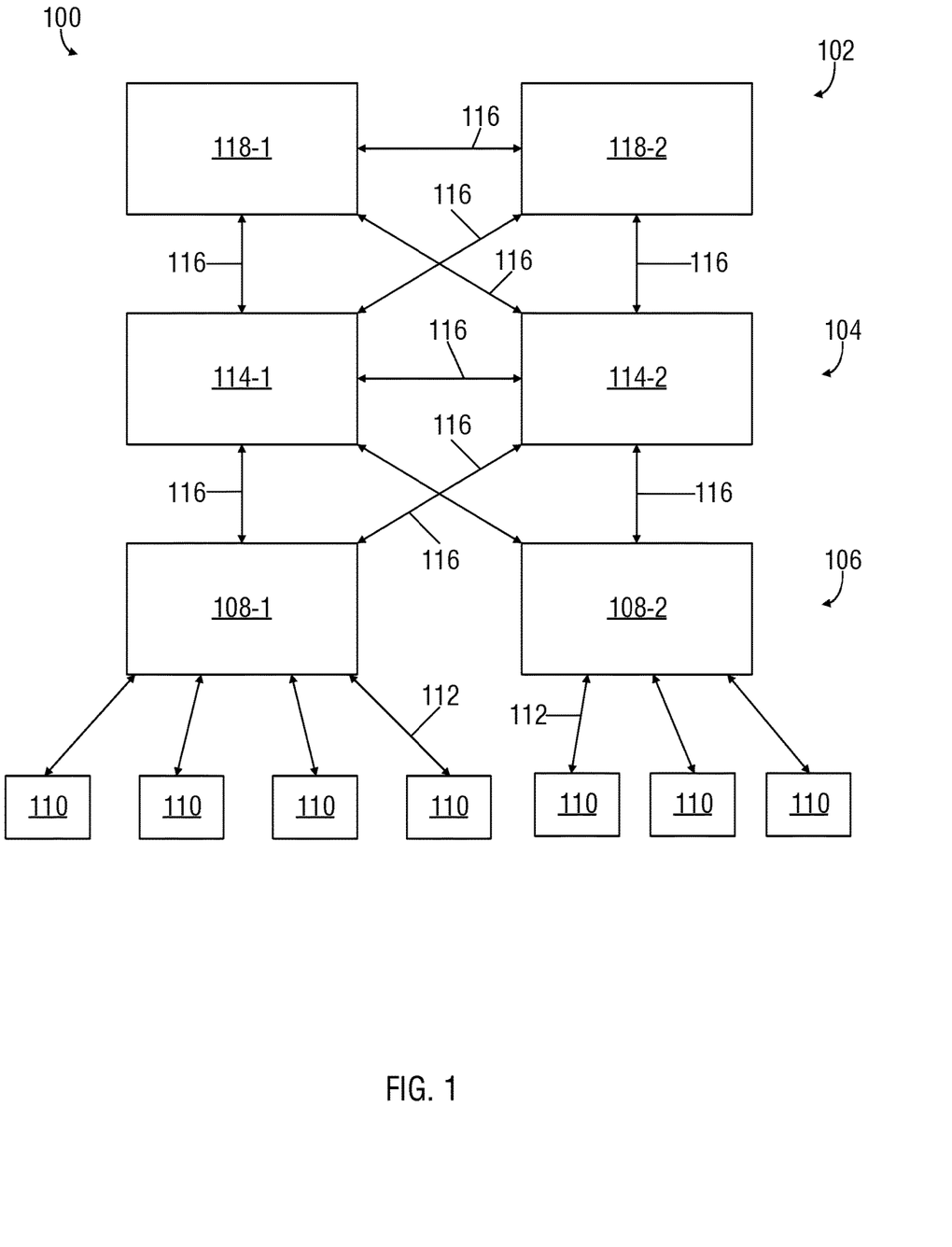
FIG. 1 is a schematic of an example computer system including multilayer switches, according to one or more examples of the disclosure.

Turning now to the Figures, FIG. 1 is a schematic of an example computer system 100, according to one or more examples of the present disclosure. The computer system 100 may be or may include part of a distributed data network, such as a campus network, and may be or include a hierarchical structure including multiple tiers or layers. However, in other embodiments, the computer system 100 may not be a network, but may employ network hardware and/or protocols. As shown in FIG. 1, the computer system 100 may include a plurality of layers including a core layer 102, an aggregation layer 104, and an access layer 106.

The access layer 106 may include a plurality of access switches 108. As shown in FIG. 1, the plurality of access switches 108-1 and 108-2 (also referred to collectively as access switches 108 or individually and generally as an access switch 108) includes a pair of access switches 108 including a first access switch 108-1 and a second access switch 108-2; however, the present disclosure is not limited thereto, and in other examples, the access layer 106 may include two or more pairs of access switches 108. More particularly, in some examples, the access layer 106 may have ten or more access switches 108. Even more particularly, in some examples, the access layer 106 may have twenty or more access switches 108. One or more access switches 108 may be stand-alone units, or in other examples, a number of access switches 108 may be housed or otherwise contained in a chassis or multiple chassis and stackable in a rack or multiple racks.

Each of the access switches 108 may be communicatively coupled to one or more end-user network devices 110 (only two indicated). In some examples, each access switch 108 may be communicatively coupled to a plurality of end-user devices 110. As shown in FIG. 1, the first access switch 108-1 is communicatively coupled to four end-user devices 110, and the second access switch 108-2 is communicatively coupled to three end-user devices 110. Examples of end-user devices 110 utilizing the computer system 100 may include desktop computers, laptop computers, PDAs, tablets, smart phones, cameras, printers, and the like.

Each of the end-user devices 110 may be communicatively coupled to the respective access switch 108 of the access layer 106 via a connection 112, as shown in FIG. 1. The connection 112 may be a wired connection or a wireless connection. Each access switch 108 may have a plurality of ports (not shown) for connection of other network devices thereto, and in some examples, each access switch 108 includes twenty-four or forty-eight ports. Generally, each port may be configured to receive or transmit traffic (e.g., packets of bits) at a speed of, for example, one gigabyte per second. It will be appreciated that the access switches 108 of the present disclosure are vendor neutral and may be selected from any combination of commodity line switches, avoiding vendor lock-in or vendor dependency of the computer system 100.

The aggregation layer 104 may include a plurality of aggregation switches 114-1 and 114-2 (also referred to collectively as aggregation switches 114 or individually and generally as an aggregation switch 114) communicatively coupled with one another and the plurality of access switches 108. More particularly, multiple aggregation switches 114 are provided for redundancy purposes and thus, the plurality of aggregation switches 114 are generally employed in pairs, where each access switch 108 is communicatively coupled to each aggregation switch 114 in a pair of aggregation switches 114. As shown in FIG. 1, the aggregation layer 104 includes a pair of aggregation switches 114 including a first aggregation switch 114-1 and a second aggregation switch 114-2; however, the present disclosure is not limited thereto, and in other examples, the aggregation layer 104 may include two or more pairs of aggregation switches 114. More particularly, in some examples, the aggregation layer 104 may have three or more pairs of aggregation switches 114.

Each aggregation switch 114 may have a plurality of ports (not shown) for connection of other network devices (e.g., switches) thereto, and in some examples, each aggregation switch 114 includes 256 ports. Generally, each port may be configured to receive or transmit traffic (e.g., packets) at a speed of, for example, ten gigabytes per second. In another example, each port may be configured to receive or transmit traffic (e.g., packets of bits) at a speed of 25 gigabytes per second. In other examples, each port may be configured to receive or transmit traffic (e.g., packets of bits) at a speed of 40 gigabytes per second. It will be appreciated that the aggregation switches 114 of the present disclosure are vendor neutral and may be selected from any combination of commodity line switches, avoiding vendor lock-in or vendor dependency of the computer system 100.

The first aggregation switch 114-1 and the second aggregation switch 114-2 may be communicatively coupled to one another and each of the first access switch 108-1 and the second access switch 108-2 via a multi-port link aggregation group 116 (illustrated as a single line to prevent obfuscation of FIG. 1). Each of the multi-port link aggregation groups 116 represents any combination of hardware and software to link the first aggregation switch 114-1 and the second aggregation switch 114-2 with one another and the first access switch 108-1 and the second access switch 108-2. For example, each of the multi-port link aggregation groups 116 may be four 10 gigabyte Ethernet ports trunked together using standard link aggregation protocol, thereby enabling each multi-port link aggregation group 116 to function as a single 40 gigabyte Ethernet port (i.e., using link aggregation control protocol (LACP)). In some examples, the first aggregation switch 114-1 and the second aggregation switch 114-2 may be communicatively coupled to one another and the first access switch 108-1 and the second access switch 108-2 via a dual multi-port link aggregation group 116 utilized to create dual 40 gigabyte Ethernet ports (i.e., an 80 gigabyte Ethernet port).

The core layer 102 may include a plurality of core switches 118-1 and 118-2 (also referred to collectively as core switches 118 or individually and generally as a core switch 118) communicatively coupled with one another and the plurality of aggregation switches 114. More particularly, the plurality of core switches 118 are provided for redundancy purposes and thus, the plurality of core switches are generally employed in pairs, where each aggregation switch 114 of a pair of aggregation switches 114 is communicatively coupled to each core switch 118 of a pair of core switches 118. As shown in FIG. 1, the plurality of core switches 118 includes a pair of core switches 118 including a first core switch 118-1 and a second core switch 118-2; however, the present disclosure is not limited thereto, and in other examples, the core layer 102 may include two or more pairs of core switches 118. More particularly, in some examples, the core layer 102 may have three or more pairs of core switches 118.

Each core switch 118 may have a plurality of ports (not shown) for connection of other network devices (e.g., switches) thereto, and in some examples includes twenty-four or forty-eight ports. Generally, each port may be configured to receive or transmit traffic (e.g., packets of bits) at a speed of, for example, 100 gigabytes per second. It will be appreciated that the core switches 118 of the present disclosure are vendor neutral and may be selected from any combination of commodity line switches, avoiding vendor lock in or vendor dependency of the computer system 100.

The first core switch 118-1 and the second core switch 118-2 may be communicatively coupled to one another and the first aggregation switch 114-1 and the second aggregation switch 114-2 via a multi-port link aggregation group 116. Each of the multi-port link aggregation groups 116 represents any combination of hardware and software to link the first core switch 118-1 and the second core switch 118-2 with one another and the first aggregation switch 114-1 and the second aggregation switch 114-2. For example, each of the multi-port link aggregation groups 116 may be four 10 gigabyte Ethernet ports trunked together using standard link aggregation protocol, thereby enabling each multi-port link aggregation group 116 to function as a single 40 gigabyte Ethernet port (i.e., using link aggregation control protocol ("LACP")). In some examples, the first core switch 118-1 and the second core switch 118-2 may be communicatively coupled to one another and the first aggregation switch 114-1 and the second aggregation switch 114-2 via a dual multi-port link aggregation group 116 utilized to create dual 40 gigabyte Ethernet ports (i.e., an 80 gigabyte Ethernet port).

The first core switch 118-1 and the second core switch 118-2 may be communicatively coupled to another network (not shown), thereby communicatively coupling the computer system 100 to another network. For example, the first core switch 118-1 and the second core switch 118-2 may sync and source traffic from a data center network (either in a local area network ("LAN") or in a wide area network ("WAN")). In other example, the first core switch 118-1 and the second core switch 118-2 may sync and source traffic from a virtual private network ("VPN"). In yet another example, the first core switch 118-1 and the second core switch 118-2 may sync and source traffic from the Internet. In some examples, the first core switch 118-1 and the second core switch 118-2 may utilize multiprotocol label switching ("MPLS") to sync and source traffic from another network.

Each of the core switches 118, aggregation switches 114, and access switches 108 operate in part according to firmware installed on the respective switches. Generally, updates (e.g., revisions) to the installed firmware may be periodically released by the manufacturer of the respective switch (or a third party in some examples) to provide additional features, provide enhancements to current features, or to correct errors (i.e., bugs) in the installed firmware. In prior instances, the updated firmware was copied to a storage module (e.g., memory module) in the respective switch and the switch was temporarily taken offline (i.e., removed from the computer system 100) to allow the firmware to be updated in the switch. The switch was then restarted to be brought back online (i.e., reconnected to the computer system 100) to run the updated firmware and to process traffic with the updated firmware.

As will be appreciated by those of skill in the art, network traffic in the form of packets of bits is directed by the switches 108, 114, 118 of the computer system 100 based on addresses associated with each switch. If traffic to the switch being updated is not rerouted before the switch is removed from the computer system 100, traffic directed to the switch to be updated may be lost in the interim between the removal of the switch and the rerouting of the traffic by the connected in-service switches. Although the interim may only be one to two seconds, the loss may still equate to tens of gigabytes of information.

Figure 2:
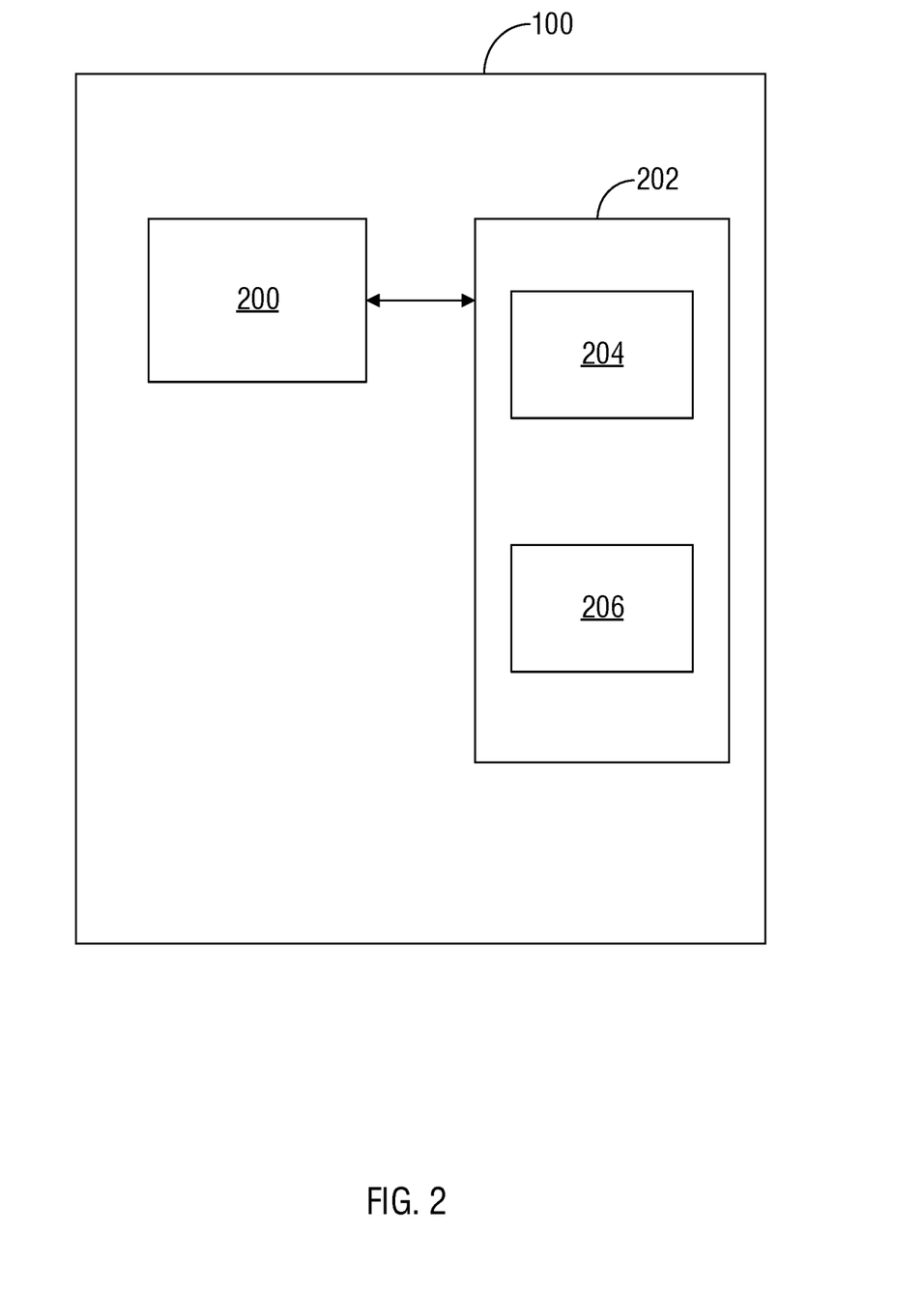
FIG. 2 is an example schematic of a processor communicatively coupled to a non-transitory computer-readable medium, according to one or more examples of the disclosure.

Accordingly, turning now to FIG. 2 with continued reference to FIG. 1, the computer system 100 of the present disclosure may include one or more processors 200 (one shown) and a non-transitory computer-readable medium 202 storing instructions 204 that when executed by the processor 200 provide for: the selection of a target switch (i.e., switch to be updated, maintained, or repaired); the temporary removal of the target switch from the computer system 100; the updating of the firmware on the target switch; and reconnection of the target switch to the computer system 100 without the loss of any traffic directed to the target switch. To that end, the processor(s) 200 may be integrated in a single device (e.g., core switch 118 or aggregation switch 114) or distributed across devices (e.g., core switches 118 or aggregation switches 114). The non-transitory computer-readable storage medium 202 may be integrated in the same device as the processor(s) 200, or the non-transitory computer-readable storage medium 202 may be separate but accessible to that device and the processor(s) 200. In an example, the non-transitory computer-readable storage medium 202, the processor(s) 200, or a combination thereof, may be implemented in any of the core switches 118 or the aggregation switches 114. Alternatively, or in addition, the non-transitory computer-readable storage medium 202 and the processor(s) 200 may be implemented in a controller connected to the core switches 118 and the aggregation switches 114, and that controls the functionalities and operation of the core switches 118 and the aggregation switches 114. As shown in FIG. 2, the non-transitory computer-readable storage medium 202 may also store the updated firmware 206 for the target switch. In other examples, the updated firmware 206 is stored on separate storage (not shown).

In one example, the stored instructions 204 can be part of an installation package that when installed can be executed by the processor(s) 200 to implement the computer system 100. In this case, the non-transitory computer-readable storage medium 202 may be a portable medium such as a CD, DVD, or flash drive or a memory maintained by a server from which the installation package can be downloaded, or installed. In another example, the stored instructions 204 may be part of an application or applications already installed. Here, the non-transitory computer-readable storage medium 202 can include integrated memory such as hard drive, solid state drive, and the like.

Figure 3:
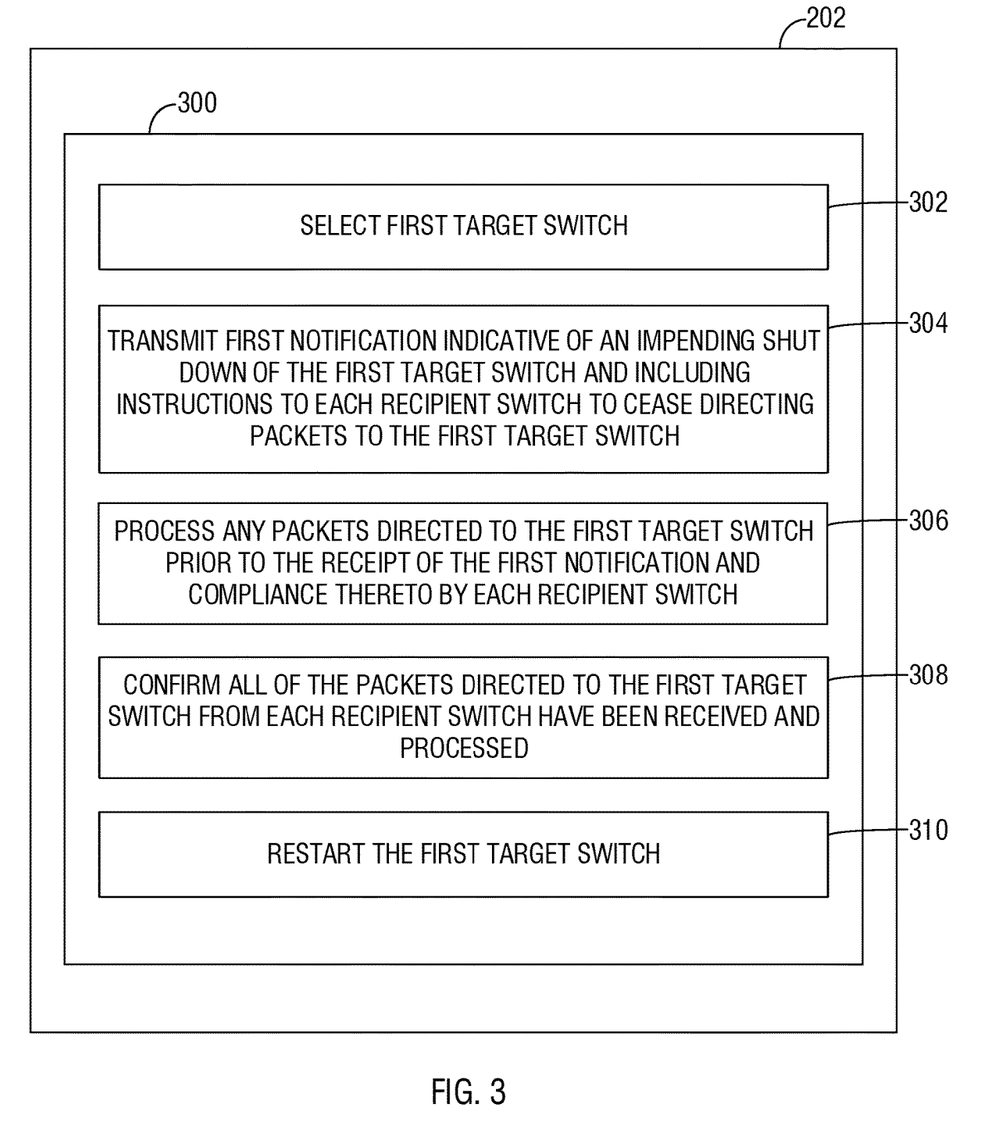
FIG. 3 is a block diagram of example instructions stored on the non-transitory computer-readable medium of FIG. 2, according to one or more examples of the disclosure.

Turning now to FIG. 3, FIG. 3 is a block diagram of example instructions 300 stored on the non-transitory computer-readable medium 202 of FIG. 2, according to one or more examples of the disclosure. The processor 200 and the implementation of the computer system 100 via the execution of the instructions 300 stored on the non-transitory computer-readable storage medium 202 may now be discussed in the context of FIGS. 1 and 2. The implementation begins with the selection of a target switch, as at instruction block 302. The target switch is selected from the pair of core switches 118 or the pair of aggregation switches 114 to be temporarily removed from the computer system 100. The selection of the target switch may be based on the availability of an update to firmware of the target switch. As used herein, the term "target switch" refers to each aggregation switch 114 or the core switch 118 selected for temporary removal from the computer system 100.

The non-transitory computer-readable storage medium 202 may include instructions (not shown) executable by the processor 200 to copy the updated firmware 206 to a storage on the target switch. In some examples, the storage may be the non-transitory computer-readable storage medium 202. In at least one example, the updated firmware 206 may be copied to the storage of the target switch prior to the selection of the target switch. For example, the processor 200 may periodically search for updated firmware 206 from the manufacturer or a third party and may store the updated firmware 206 in the storage of the respective aggregation switch 114 or core switch 118, or in some examples, in the non-transitory computer-readable storage medium 202. The non-transitory computer-readable storage medium 202 may include instructions (not shown) executable by the processor 200 to direct the target switch to initiate a restart of the target switch.

To that end, as at instruction block 304, the non-transitory computer-readable storage medium 202 may include instructions executable by the processor 200 to transmit, via the target switch, a respective first notification to (i) each core switch 118 and aggregation switch 114 not selected as the target switch and (ii) the plurality of access switches 108 if an aggregation switch 114 is selected as the target switch. The first notification may be indicative of an impending shut down of the target switch and may include instructions to each recipient switch to cease directing packets to the target switch. Each of the first notifications is dependent on a control plane protocol utilized between the target switch and the recipient switch. Accordingly, the control plane protocol utilized between the core switches 118 and the aggregation switches 114 may differ from the control plane protocol utilized between the access switches 108 and the aggregation switches 114.

For example, the control plane protocol between the aggregation switches 114 and the access switches 108 may be a link aggregation control protocol ("LACP") or a spanning tree protocol ("STP"). Accordingly, in the instance the protocol is a LACP, the first notification sent by the target switch is a LACP data unit ("LACPDU") protocol packet with a collecting flag set to FALSE. Such a first notification communicates to the recipient switch that the recipient switch should stop sending traffic (i.e., packets) to the target device and instead direct all packets to the other in-service switch (e.g., other aggregation switch 114 if the target device is an aggregation switch 114). In the instance in which the control plane protocol is a STP, the first notification sent by the target switch is to change the link cost of the participating links with a higher cost to the root bridge and wait for the recipient switch to send an STP bride data protocol unit ("BPDU") packet acknowledging that the recipient switch is not using the target switch to reach the root. If the target switch-recipient switch is already the root bridge, then the LACP protocol above will be sufficient as the recipient switch will continue to be the root bridge and the instructions provided herein will not change the root bridge.

In other examples, the control plane protocol between the core switches 118 and the aggregation switches 114 may be an open shortest path first ("OSPF") protocol and border gateway protocol ("BGP"), or static routes from the recipient switches to the target switch. Regarding the first notification for OSPF and BGP, the target switch will increase the default-metric for all connected routes that the target switch is redistributing into OSPF. This will force the other OSPF routers connected to the target switch to route traffic to the in-service switch. Regarding the first notification for static routes from other devices to the target switch, typically the static routes run in conjunction with bidirectional forwarding detection ("BFD"). Accordingly, the target switch will stop sending BFD packets (async and echo), thus triggering the recipient switch to stop using the static route pointing to the target switch and use the in-service switch.

As at block 306, the non-transitory computer-readable storage medium 202 may include instructions executable by the processor 200 to process, via the first target switch, any packets directed to the first target switch prior to the receipt of the first notification and compliance thereto by each recipient switch. Packets directed to the target switch prior to compliance with the first notification may be queued in the receiving queue of the target switch and in queue(s) of originating switch(es) (e.g., recipient switch(es)) directly communicatively coupled to the target switch. Accordingly, the target switch may process each of the packets disposed in the receiving queue and originating switch queues prior to being temporarily removed from the computer system 100.

As at block 308, the non-transitory computer-readable storage medium 202 may include instructions executable by the processor 200 to confirm, via the target switch, all of the packets directed to the target switch from (i) each core switch 118 and aggregation switch 114 not selected as the target switch, and (ii) the plurality of access switches 108 if an aggregation switch 114 is selected as the target switch, have been received and processed. Upon confirmation that all of the packets in the receiving and originating switch queues have been processed, the non-transitory computer-readable storage medium 202 may include instructions executable by the processor 200 to restart the target switch, as at instruction block 310. Restarting of the target switch may be carried out in a multitude of manners including, but not limited to, unplugging or otherwise disrupting the power supply to the target switch. In instances in which the processing may not be confirmed, the non-transitory computer-readable storage medium 202 may include instructions executable by the processor 200 to search the receiving and/or originating switch queues for additional packets.

Figure 4:
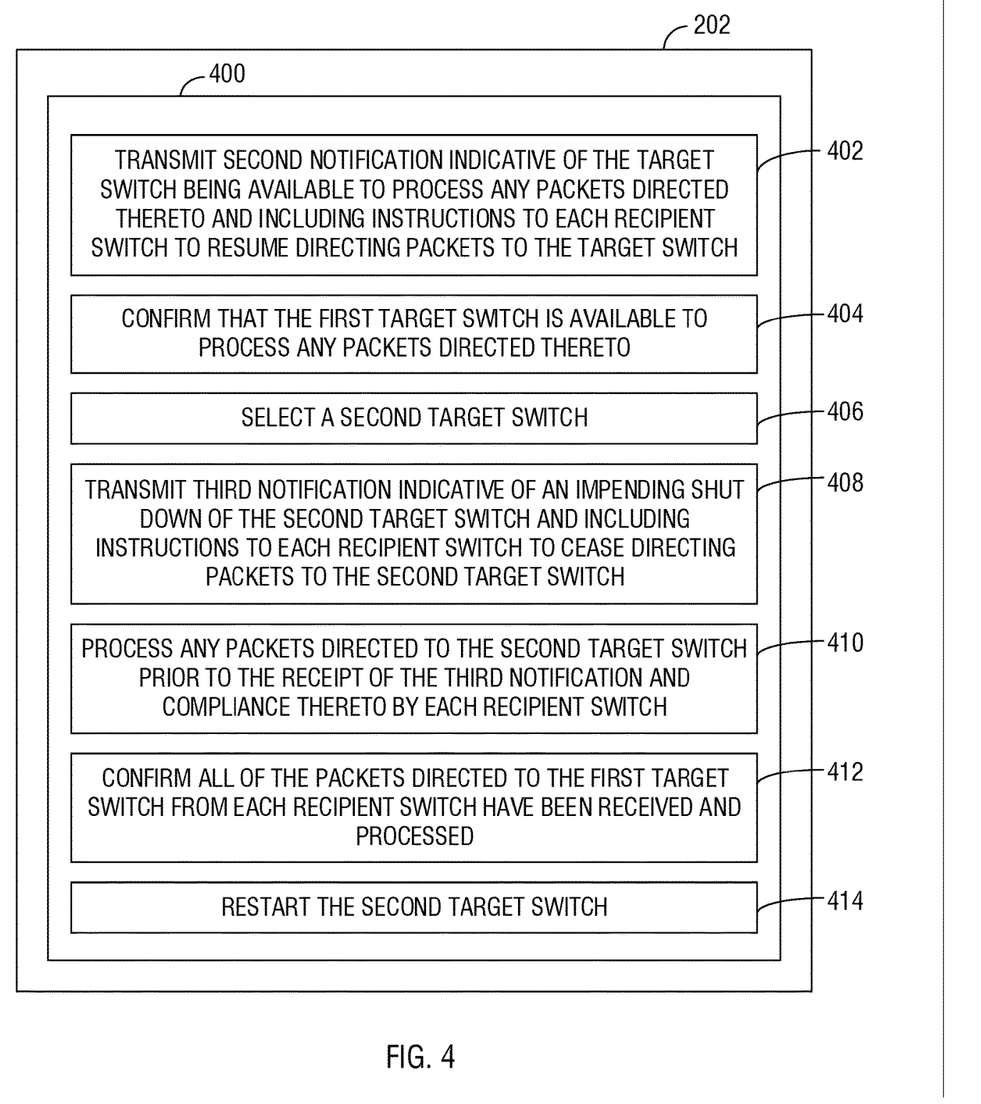
FIG. 4 is a block diagram of example instructions stored on the non-transitory computer-readable medium of FIG. 2, according to one or more examples of the disclosure.

Turning now to FIG. 4, FIG. 4 is a block diagram of example instructions 400 stored on the non-transitory computer-readable medium 202 of FIGS. 2 and 3, according to one or more examples of the disclosure. In one or more examples, the instructions 400 of FIG. 4 may be a continuation of the instructions 300 set forth in FIG. 3. After restarting the target switch, the updated firmware 206 may run on the target switch, thereby replacing the previous version of the firmware installed on the target switch. As at instruction block 402, the non-transitory computer-readable storage medium 202 may include instructions executable by the processor 200 to transmit, via the target switch after restarting the target switch, a second notification to (i) each core switch 118 and aggregation switch 114 not selected as the target switch, and (ii) the plurality of access switches 108 if an aggregation switch 114 is selected as the target switch. The second notification may be indicative of the target switch being available to process any packets directed thereto and including instructions to each recipient switch to resume directing packets to the target switch.

Similar to the first notification, each of the second notifications may be dependent on the control plane protocol utilized between the target switch and the recipient switch. Accordingly, in the instance the control plane protocol is a LACP, the second notification sent by the target switch is a LACPDU protocol packet with a collecting flag set to TRUE. Such a second notification communicates to the recipient switch that the recipient switch should begin sending traffic (i.e., packets) to the target device. In the instance in which the control plane protocol is a STP, the second notification sent by the target switch is to reset the link cost of the participating links to the same costs before selecting the target device, such that the traffic will begin flowing again to the target switch.

Regarding the second notification for OSPF and BGP, the target switch will return the default-metric for all connected routes that it is redistributing into OSPF to the default-metric provided before the selection of the target switch. Accordingly, the other OSPF routers connected to the target switch may route traffic to the target switch. Regarding the second notification for static routes from other devices to the target switch, as noted above the static routes run in conjunction with bidirectional forwarding detection (BFD). Accordingly, the target switch will resume sending BFD packets (async and echo), thus triggering the recipient switch to resume using the static route pointing to the target switch.

As at block 404, the non-transitory computer-readable storage medium 202 may include instructions executable by the processor 200 to confirm, after restarting the first target switch, that the first target switch is available to process any packets directed thereto. Confirmation may be provided by monitoring the target switch to determine if traffic sent to the target switch by (i) each core switch 118 and aggregation switch 114 not selected as the second target switch, and (ii) the plurality of access switches 108 if an aggregation switch 114 is selected as the second target switch, has been processed by the target switch. For example, the receiving queue of the target switch and the originating switch queues of the recipient switches are receiving packets.

The non-transitory computer-readable storage medium 202 may include instructions executable by the processor 200 to select a second target switch from the pair of core switches 118 or the pair of aggregation switches 114 to temporarily remove from the computer system 100, as at instruction block 406. The selection of the second target switch may be dependent on the selection of the first target switch. For example, in an instance in which the first aggregation switch 114-1 was initially selected as the target switch, the second target switch selected may be the second aggregation switch 114-2, or vice versa. Alternatively, in an instance in which the first core switch 118-1 was initially selected as the target switch, the second target switch selected may be the second core switch 118-2, or vice versa.

The non-transitory computer-readable storage medium 202 may include instructions (not shown) executable by the processor 200 to copy the updated firmware 206 to a storage on the second target switch. In some examples, the storage may be the non-transitory computer-readable storage medium 202. In at least one example, the updated firmware 206 may be copied to the storage of the second target switch prior to the selection of the second target switch. For example, the processor 200 may periodically search for updated firmware 206 from the manufacturer or third party and may store the updated firmware 206 in the storage of the respective aggregation switch 114 or core switch 118. The non-transitory computer-readable storage medium 202 may include instructions (not shown) executable by the processor 200 to direct the second target switch to initiate a restart of the second target switch.

As at block 408, the non-transitory computer-readable storage medium 202 may include instructions executable by the processor 200 to transmit, via the second target switch, a respective third notification to (i) each core switch 118 and aggregation switch 114 not selected as the second target switch, and (ii) the plurality of access switches 108 if an aggregation switch 114 is selected as the second target switch. The third notification may be indicative of an impending shut down of the second target switch and including instructions to each recipient switch to cease directing packets to the second target switch. Similar to the first notifications, each of the third notifications is dependent on a control plane protocol utilized between the second target switch and the recipient switch. Accordingly, the third notifications may be provided in a manner substantially similar to the manner provided with respect to the first notifications and thus will not be repeated again for the sake of brevity.

The non-transitory computer-readable storage medium 202 may include instructions executable by the processor 200 to process, via the second target switch, any packets directed to the second target switch prior to the receipt of the third notification and compliance thereto by each recipient switch, as at instruction block 410. Packets directed to the second target switch prior to compliance with the third notification may be queued in the receiving queue of the second target switch and in a queue of originating switch(es) (e.g., recipient switch(es)) directly communicatively coupled to the second target switch. Accordingly, the second target switch may process each of the packets disposed in the receiving and originating switch queues prior to being temporarily removed from the computer system 100.

As at block 412, the non-transitory computer-readable storage medium 202 may include instructions executable by the processor 200 to confirm, via the second target switch, all of the packets directed to the second target switch from (i) each core switch 118 and aggregation switch 114 not selected as the second target switch, and (ii) the plurality of access switches 108 if an aggregation switch 114 is selected as the second target switch, have been received and processed. Upon confirmation that all of the packets in the receiving and originating switch queues have been processed, the non-transitory computer-readable storage medium 202 may include instructions executable by the processor 200 to restart the second target switch, as at instruction block 414. Restarting of the second target switch may be carried out in a multitude of manners including, but not limited to, unplugging or otherwise disrupting the power supply to the second target switch. In instances in which the processing may not be confirmed, the non-transitory computer-readable storage medium 202 may include instructions executable by the processor 200 to search the receiving and/or originating switch queues for additional packets.

As at block 416, the non-transitory computer-readable storage medium 202 may include instructions executable by the processor 200 to transmit, via the second target switch after restarting the second target switch, a fourth notification to (i) each core switch 118 and aggregation switch 114 not selected as the second target switch, and (ii) the plurality of access switches 108 if an aggregation switch 114 is selected as the second target switch. The fourth notification may be indicative of the second target switch being available to process any packets directed thereto and including instructions to each recipient switch to resume directing packets to the second target switch. Similar to the second notifications, each of the fourth notifications is dependent on a control plane protocol utilized between the second target switch and the recipient switch. Accordingly, the fourth notifications may be provided in a manner substantially similar to the manner provided with respect to the second notifications and thus will not be repeated again for the sake of brevity.

Figure 5:
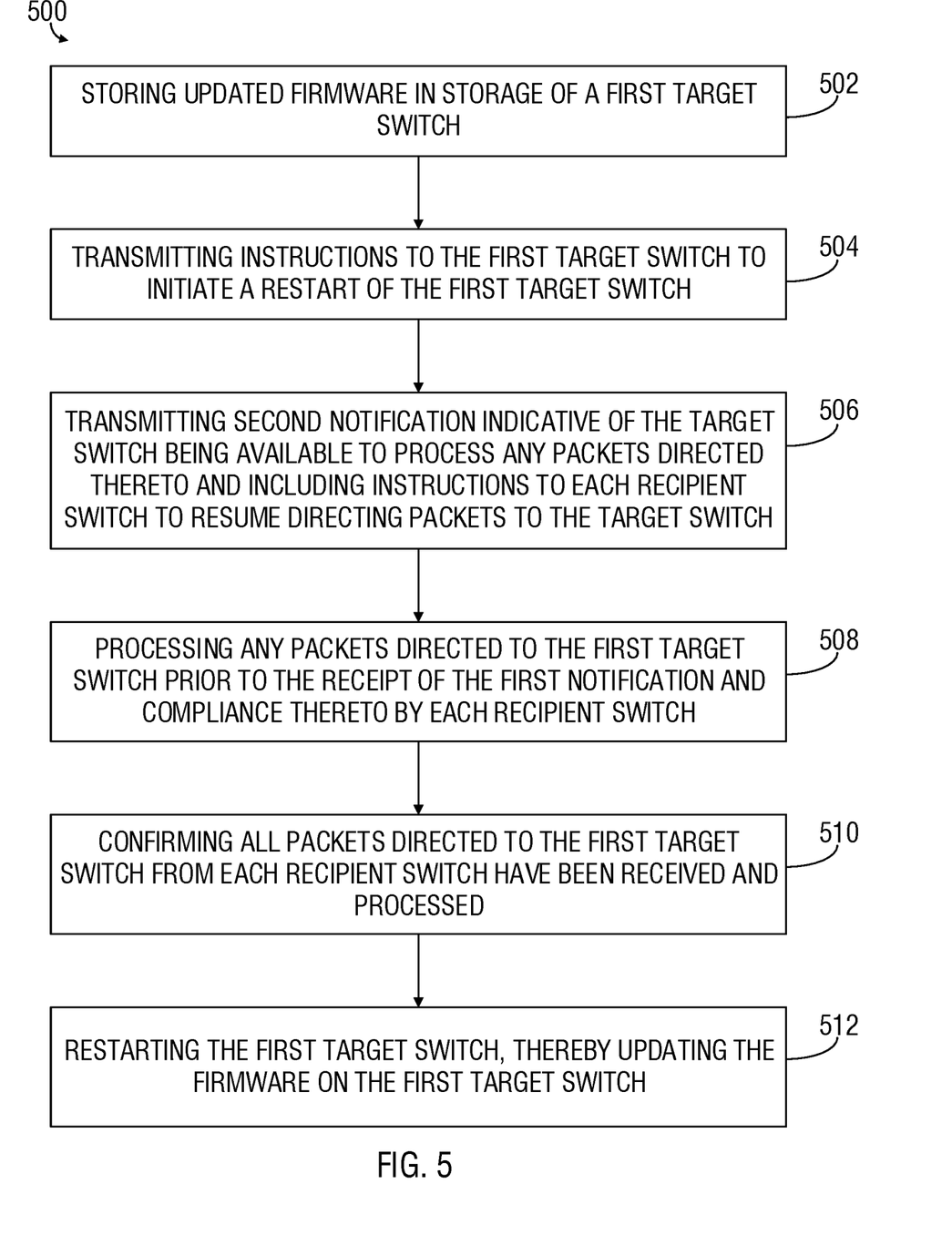
FIG. 5 is a flowchart depicting a method for updating firmware on one or more switches in a computer system, according to one or more examples of the disclosure.

Referring now to FIG. 5, FIG. 5 is a flowchart depicting a method 500 for updating firmware on one or more switches in a computer system 100, according to one or more examples of the present disclosure. In discussing FIG. 5, reference is made to the schematics of FIGS. 1-4 to provide contextual examples. Implementation, however, is not limited to those examples.

As shown in FIG. 5, the method 500 may start at block 502 and may include storing updated firmware 206 in storage of a first target switch. The first target switch may form part of the computer system 100 including a core layer 102, an aggregation layer 104, and an access layer 106 including a plurality of access switches 108. The first target switch may be selected from (i) a pair of core switches 118 of the core layer 102 or (ii) a pair of aggregation switches 114 of the aggregation layer 106.

The method 500 may also include transmitting instructions to the first target switch to initiate a restart of the first target switch, as at block 504, and transmitting, via the first target switch, a respective first notification to (i) each core switch 118 and aggregation switch 114 not selected as the first target switch, and (ii) the plurality of access switches 108 if an aggregation switch 114 is selected as the first target switch, as at block 506. The first notification may be indicative of an impending shut down of the first target switch and may include instructions to each recipient switch to cease directing packets to the first target switch.

The method 500 may further include processing, via the first target switch, any packets directed to the first target switch prior to the receipt of the first notification and compliance thereto by each recipient switch, as at block 508. The method may also include confirming, via the first target switch, all packets directed to the first target switch from (i) each core switch 118 and aggregation switch 114 not selected as the first target switch, and (ii) the plurality of access switches 108 if an aggregation switch 114 is selected as the first target switch, have been received and processed, as at block 510. The method 500 may further include restarting the first target switch, thereby updating the firmware on the first target switch.

In one or more examples, the method 500 may also include transmitting, via the first target switch, a second notification to (i) each core switch 118 and aggregation switch 114 not selected as the first target switch, and (ii) the plurality of access switches 108 if an aggregation switch 114 is selected as the first target switch. The second notification may be indicative of the first target switch being available to process any packets directed thereto and may include instructions to each recipient switch to resume directing packets to the first target switch.

In another example, the method 500 may include: confirming, after restarting the first target switch, that the first target switch is available to process any packets directed thereto; selecting a second target switch from (i) the pair of core switches 118 of the core layer 102 or (ii) the pair of aggregation switches 114 of the aggregation layer 106, the selection of the second target switch dependent on the selection of the first target switch; storing the updated firmware 206 in storage of the second target switch; transmitting instructions to the second target switch to initiate a restart of the second target switch; transmitting, via the second target switch, a respective third notification to (i) each core switch 118 and aggregation switch 114 not selected as the second target switch, and (ii) the plurality of access switches 108 if an aggregation switch 114 is selected as the second target switch, the third notification indicative of an impending shut down of the second target switch and including instructions to each recipient switch to cease directing packets to the second target switch; processing, via the second target switch, any packets directed to the second target switch prior to the receipt of the third notification and compliance thereto by each recipient switch; confirming, via the second target switch, all packets directed to the second target switch from (i) each core switch 118 and aggregation switch 114 not selected as the second target switch, and (ii) the plurality of access switches 108 if an aggregation switch 114 is selected as the second target switch, have been received and processed; and restarting the second target switch, thereby updating the firmware on the second target switch.

In one or more examples, the first target switch is a first aggregation switch 114-1 of the pair of aggregation switches 114, and the second target switch is a second aggregation switch 114-2 of the pair of aggregation switches 114. In another example, the first target switch is a first core switch 118-1 of the pair of core switches 118, and the second target switch is a second core switch 118-2 of the pair of core switches 118. In one or more examples, each of the first notifications is dependent on a control plane protocol utilized between the first target switch and the recipient switch. In another example, each of the third notifications is dependent on a control plane protocol utilized between the second target switch and the recipient switch In one or more examples, the method 500 may include transmitting a fourth notification to (i) each core switch 118 and aggregation switch 114 not selected as the second target switch, and (ii) the plurality of access switches 108 if an aggregation switch 114 is selected as the second target switch, the fourth notification indicative of the second target switch being available to process any packets directed thereto and including instructions to each recipient switch to resume directing packets to the second target switch.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and BLUE-RAY® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a CD-ROM), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A computer system comprising:
  a core layer comprising a pair of core switches communicatively coupled with one another;
  an access layer comprising a plurality of access switches;
  an aggregation layer comprising a pair of aggregation switches communicatively coupled with one another, each aggregation switch further communicatively coupled to each core switch and each access switch;
  a processor; and
  a non-transitory computer-readable storage medium comprising instructions executable by the processor to:
    select a first target switch from the pair of core switches or the pair of aggregation switches to temporarily remove from the computer system;
    transmit a respective first notification to (i) each core switch and aggregation switch not selected as the first target switch, and (ii) the plurality of access switches if an aggregation switch is selected as the first target switch, the first notification indicative of an impending shut down of the first target switch and including instructions to each recipient switch to cease directing packets to the first target switch;
    process any packets directed to the first target switch prior to the receipt of the first notification and compliance thereto by each recipient switch;

confirm all of the packets directed to the first target switch from each recipient switch have been received and processed; and restart the first target switch.

2. The computer system of claim 1, wherein the non-transitory computer-readable storage medium further comprises instructions executable by the processor to:

transmit, after restarting the first target switch, a second notification to (i) each core switch and aggregation switch not selected as the first target switch, and (ii) the plurality of access switches if an aggregation switch is selected as the first target switch, the second notification indicative of the first target switch being available to process any packets directed thereto and including instructions to each recipient switch to resume directing packets to the first target switch.

3. The computer system of claim 2, wherein the non-transitory computer-readable storage medium further comprises instructions executable by the processor to:

confirm, after restarting the first target switch, that the first target switch is available to process any packets directed thereto;

select a second target switch from the pair of core switches or the pair of aggregation switches to temporarily remove from the computer system, the selection of the second target switch dependent on the selection of the first target switch;

transmit a respective third notification to (i) each core switch and aggregation switch not selected as the second target switch, and (ii) the plurality of access switches if an aggregation switch is selected as the second target switch, the third notification indicative of an impending shut down of the second target switch and including instructions to each recipient switch to cease directing packets to the second target switch;

process any packets directed to the second target switch prior to the receipt of the third notification and compliance thereto by each recipient switch;

confirm all of the packets directed to the second target switch from each recipient switch have been received and processed; and restart the second target switch.

4. The computer system of claim 3, wherein the non-transitory computer-readable storage medium further comprises instructions executable by the processor to:

transmit, after restarting the second target switch, a fourth notification to (i) each core switch and aggregation switch not selected as the second target switch, and (ii) the plurality of access switches if an aggregation switch is selected as the second target switch, the fourth notification indicative of the second target switch being available to process any packets directed thereto and including instructions to each recipient switch to resume directing packets to the second target switch.

5. The computer system of claim 3, wherein the first target switch is a first aggregation switch of the pair of aggregation switches, and the second target switch is a second aggregation switch of the pair of aggregation switches.

6. The computer system of claim 3, wherein the first target switch is a first core switch of the pair of core switches, and the second target switch is a second core switch of the pair of core switches.

7. The computer system of claim 3, wherein the processor is included in at least one of the first target switch and the second target switch.

8. The computer system of claim 1, wherein each of the first notifications is dependent on a control plane protocol utilized between the first target switch and the recipient switch.

9. A method for updating firmware on one or more switches in a computer system, comprising:

storing updated firmware in storage of a first target switch, the first target switch forming part of the computer system including a core layer, an aggregation layer, and an access layer including a plurality of access switches, and the first target switch selected from (i) a pair of core switches of the core layer or (ii) a pair of aggregation switches of the aggregation layer;

transmitting instructions to the first target switch to initiate a restart of the first target switch;

transmitting a respective first notification to (i) each core switch and aggregation switch not selected as the first target switch, and (ii) the plurality of access switches if an aggregation switch is selected as the first target switch, the first notification indicative of an impending shut down of the first target switch and including instructions to each recipient switch to cease directing packets to the first target switch;

processing any packets directed to the first target switch prior to the receipt of the first notification and compliance thereto by each recipient switch;

confirming all packets directed to the first target switch from each recipient switch have been received and processed; and restarting the first target switch, thereby updating the firmware on the first target switch.

10. The method of claim 9, further comprising:

transmitting a second notification to (i) each core switch and aggregation switch not selected as the first target switch, and (ii) the plurality of access switches if an aggregation switch is selected as the first target switch, the second notification indicative of the first target switch being available to process any packets directed thereto and including instructions to each recipient switch to resume directing packets to the first target switch.

11. The method of claim 10, further comprising:

confirming, after restarting the first target switch, that the first target switch is available to process any packets directed thereto;

selecting a second target switch from (i) the pair of core switches of the core layer or (ii) the pair of aggregation switches of the aggregation layer, the selection of the second target switch dependent on the selection of the first target switch;

storing the updated firmware in storage of the second target switch;

transmitting instructions to the second target switch to initiate a restart of the second target switch;

transmitting a respective third notification to (i) each core switch and aggregation switch not selected as the second target switch, and (ii) the plurality of access switches if an aggregation switch is selected as the second target switch, the third notification indicative of an impending shut down of the second target switch and including instructions to each recipient switch to cease directing packets to the second target switch;

processing any packets directed to the second target switch prior to the receipt of the third notification and compliance thereto by each recipient switch;

confirming all packets directed to the second target switch from each recipient switch have been received and processed; and restarting the second target switch, thereby updating the firmware on the second target switch.

12. The method of claim 11, further comprising:
transmitting a fourth notification to (i) each core switch and aggregation switch not selected as the second target switch, and (ii) the plurality of access switches if an aggregation switch is selected as the second target switch, the fourth notification indicative of the second target switch being available to process any packets directed thereto and including instructions to each recipient switch to resume directing packets to the second target switch.

13. The method of claim 11, wherein the first target switch is a first aggregation switch of the pair of aggregation switches, and the second target switch is a second aggregation switch of the pair of aggregation switches.

14. The method of claim 11, wherein the first target switch is a first core switch of the pair of core switches, and the second target switch is a second core switch of the pair of core switches.

15. The method of claim 11, wherein each of the third notifications is dependent on a control plane protocol utilized between the second target switch and the recipient switch.

16. The method of claim 9, wherein each of the first notifications is dependent on a control plane protocol utilized between the first target switch and the recipient switch.

17. A non-transitory computer-readable medium storing computer-executable instructions, which when executed, cause a computer to:

store updated firmware in storage of a first target switch, the first target switch forming part of a computer system including a core layer, an aggregation layer, and an access layer including a plurality of access switches, and the first target switch selected from (i) a pair of core switches of the core layer or (ii) a pair of aggregation switches of the aggregation layer;

direct the first target switch to initiate a restart of the first target switch;

transmit a respective first notification to (i) each core switch and aggregation switch not selected as the first target switch, and (ii) the plurality of access switches if an aggregation switch is selected as the first target switch, the first notification indicative of an impending shut down of the first target switch and including instructions to each recipient switch to cease directing packets to the first target switch;

process any packets directed to the first target switch prior to the receipt of the first notification and compliance thereto by each recipient switch;

confirm all packets directed to the first target switch from each recipient switch have been received and processed;

restart the first target switch to update the firmware on the first target switch; and transmit a second notification to (i) each core switch and aggregation switch not selected as the first target switch, and (ii) the plurality of access switches if an aggregation switch is selected as the first target switch, the second notification indicative of the first target switch being available to process any packets directed thereto and including instructions to each recipient switch to resume directing packets to the first target switch.

18. The non-transitory computer-readable medium of claim 17, further storing computer-executable instructions, which when executed, cause a computer to:

confirm, after restarting the first target switch, that the first target switch is available to process any packets directed thereto;

store the updated firmware in storage of a second target switch, the second target switch selected from (i) the pair of core switches of the core layer or (ii) the pair of aggregation switches of the aggregation layer, the selection of the second target switch dependent on the selection of the first target switch;

direct the second target switch to initiate a restart of the second target switch;

transmit a respective third notification to (i) each core switch and aggregation switch not selected as the second target switch, and (ii) the plurality of access switches if an aggregation switch is selected as the second target switch, the third notification indicative of an impending shut down of the second target switch and including instructions to each recipient switch to cease directing packets to the second target switch;

process any packets directed to the second target switch prior to the receipt of the third notification and compliance thereto by each recipient switch;

confirm all of the packets directed to the second target switch from each recipient switch have been received and processed; and restart the second target switch to update the firmware on the second target switch; and transmit a fourth notification to (i) each core switch and aggregation switch not selected as the second target switch, and (ii) the plurality of access switches if an aggregation switch is selected as the second target switch, the fourth notification indicative of the second target switch being available to process any packets directed thereto and including instructions to each recipient switch to resume directing packets to the second target switch.

19. The non-transitory computer-readable medium of claim 18, wherein the non-transitory computer-readable medium is included in at least one of the first target switch and the second target switch.

20. The non-transitory computer-readable medium of claim 17, wherein each of the first notifications and the second notifications is dependent on a control plane protocol utilized between the first target switch and the recipient switch.

* * * * *